(12) United States Patent
Abernathy et al.

(10) Patent No.: US 7,831,808 B2
(45) Date of Patent: *Nov. 9, 2010

(54) QUEUE DESIGN SYSTEM SUPPORTING DEPENDENCY CHECKING AND ISSUE FOR SIMD INSTRUCTIONS WITHIN A GENERAL PURPOSE PROCESSOR

(75) Inventors: Christopher Michael Abernathy, Austin, TX (US); Jonathan James DeMent, Austin, TX (US); Ronald Hall, Cedar Park, TX (US); David Shippy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/961,914

(22) Filed: Dec. 20, 2007

(65) Prior Publication Data

US 2008/0168261 A1    Jul. 10, 2008

Related U.S. Application Data

(63) Continuation of application No. 11/204,413, filed on Aug. 16, 2005, now Pat. No. 7,328,330.

(51) Int. Cl.
*G06F 9/30* (2006.01)
*G06F 9/40* (2006.01)
*G06F 15/00* (2006.01)

(52) U.S. Cl. .................................... 712/216

(58) Field of Classification Search ............. 712/216
See application file for complete search history.

(56) References Cited

U.S. PATENT DOCUMENTS 5,978,838 A    11/1999    Mohamed et al.
6,742,111 B2    5/2004    Soni

OTHER PUBLICATIONS

Espasa et al.; "Out-of-Order Vector Architectures"; 1997; IEEE Computer Society; International Symposium on Microarchitecture '97; pp. 160-170.

*Primary Examiner*—Eddie P Chan
*Assistant Examiner*—Corey S Faherty
(74) *Attorney, Agent, or Firm*—Matthew B. Talpis

(57) ABSTRACT

A processor includes a general purpose (GP) unit adapted to receive and configured to execute GP instructions; and includes a single instruction multiple data (SIMD) unit adapted to receive and configured to execute SIMD instructions. An instruction unit comprises a first logic unit coupled to the GP unit and a second logic unit coupled to the SIMD unit, wherein SIMD instructions are processed subsequent to GP instructions. In the first logic unit a GP instruction with unresolved dependencies unconditionally causes subsequent SIMD instructions to stall, and an SIMD instruction with unresolved dependencies does not cause subsequent GP instructions to stall. The first logic unit resolves dependencies in GP instructions, provides dependency-free instructions to the GP unit, and provides SIMD instructions to the second logic unit. The second logic unit resolves dependencies in SIMD instructions and provides dependency-free instructions to the SIMD unit.

12 Claims, 4 Drawing Sheets

QUEUE DESIGN SYSTEM SUPPORTING DEPENDENCY CHECKING AND ISSUE FOR SIMD INSTRUCTIONS WITHIN A GENERAL PURPOSE PROCESSOR

CROSS-REFERENCE TO RELATED APPLICATIONS

This application is a continuation of, and claims the benefit of the filing date of, U.S. patent application Ser. No. 11/204,413 entitled "A QUEUE DESIGN SYSTEM SUPPORTING DEPENDENCY CHECKING AND ISSUE FOR SIMD INSTRUCTIONS WITHIN A GENERAL PURPOSE PROCESSOR", filed Aug. 16, 2005 now U.S. Pat. No. 7,328,330.

FIELD OF THE INVENTION

The present invention relates generally to a queue design for SIMD instructions, and more particularly, to an independent queue design supporting dependency checking for SIMD instructions that share most of the front-end of the processor pipeline with a General Purpose instructions.

DESCRIPTION OF THE RELATED ART

Modern processors support single instruction multiple data ("SIMD") extensions. SIMD indicates a single instruction that operates on a number of data items in parallel. For example, an "add" SIMD instruction may add eight 16 bit values in parallel. These instructions increase execution speed dramatically by accomplishing multiple operations within one instruction. Examples of these SIMD instructions include multimedia extension ("MMX") instructions, SSE instructions, and vectored multimedia extension ("VMX") instructions.

There are a few general problems associated with SIMD instructions that lead to an increase in execution latency and a failure to efficiently utilize resources for a processor. For example, many of the SIMD arithmetic instructions are complex and may take many cycles to execute. Each SIMD load and store instruction may take hundreds of cycles to complete due to the memory latency if they miss in the cache memory. For loads and stores, these SIMD instructions will stall their data depended SIMD instructions until their completion. In many modern superscalar pipeline processor designs, the SIMD Unit and the General Purpose ("GP") Unit may share their dependency checking, issue, dispatch, and decode pipeline stages. Therefore, the data dependency and memory latency conditions of these SIMD instructions can also stall the non-related GP instructions (such as PowerPC instruction and x86 instructions) as well because some of the GP instructions can exist behind the depended SIMD instructions in a program flow. This stall condition not only extends the overall execution latency of the program but also causes some of the execution Units, such as a GP Unit to be idle. This leads to a detrimental affect on the overall processor performance.

Complicated SIMD instructions should not affect the execution of GP instructions. Although SIMD instructions provide a distinct advantage, problems associated with SIMD instructions can affect the overall performance of the processor. An invention that can isolate the problems associated with SIMD instructions and not allow these problems to affect execution of GP instructions would be a vast improvement over the prior art.

SUMMARY OF THE INVENTION

A processor includes a general purpose (GP) unit adapted to receive GP instructions and configured to execute the GP instructions. The processor also includes a single instruction multiple data (SIMD) unit adapted to receive SIMD instructions and configured to execute the SIMD instructions. An instruction unit comprises a first logic unit coupled to the GP unit and a second logic unit coupled to the SIMD unit, wherein SIMD instructions are processed subsequent to GP instructions. The first logic unit is further configured such that a GP instruction with unresolved dependencies unconditionally causes subsequent SIMD instructions to stall, and an SIMD instruction with unresolved dependencies does not cause subsequent GP instructions to stall. The first logic unit is coupled to receive GP instructions and SIMD instructions and configured to: decode the GP instructions and the SIMD instructions; check the GP instructions for dependencies; resolve any dependencies in the GP instructions; provide the GP instructions that are free of dependencies to the GP unit; and subsequent to providing the GP instructions that are free of dependencies to the GP unit, provide the SIMD instructions to the second logic unit when there are no remaining older GP instructions with dependencies; wherein the first logic unit is not configured to check the SIMD instructions for dependencies. The second logic unit is coupled to receive the SIMD instructions from the first logic unit and, subsequent to providing, by the first logic unit, the GP instructions that are free of dependencies to the GP unit, configured to: check the SIMD instructions for dependencies; resolve any dependencies in the SIMD instructions; and provide the SIMD instructions that are free of dependencies to the SIMD unit.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, intimate details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are implemented in hardware in order to provide the most efficient implementation. Alternatively, the functions may be performed by a processor such as a computer or an electronic data processor in accordance with code such as computer program code, software, and/or integrated circuits that are coded to perform such functions, unless indicated otherwise.

Figure 1:
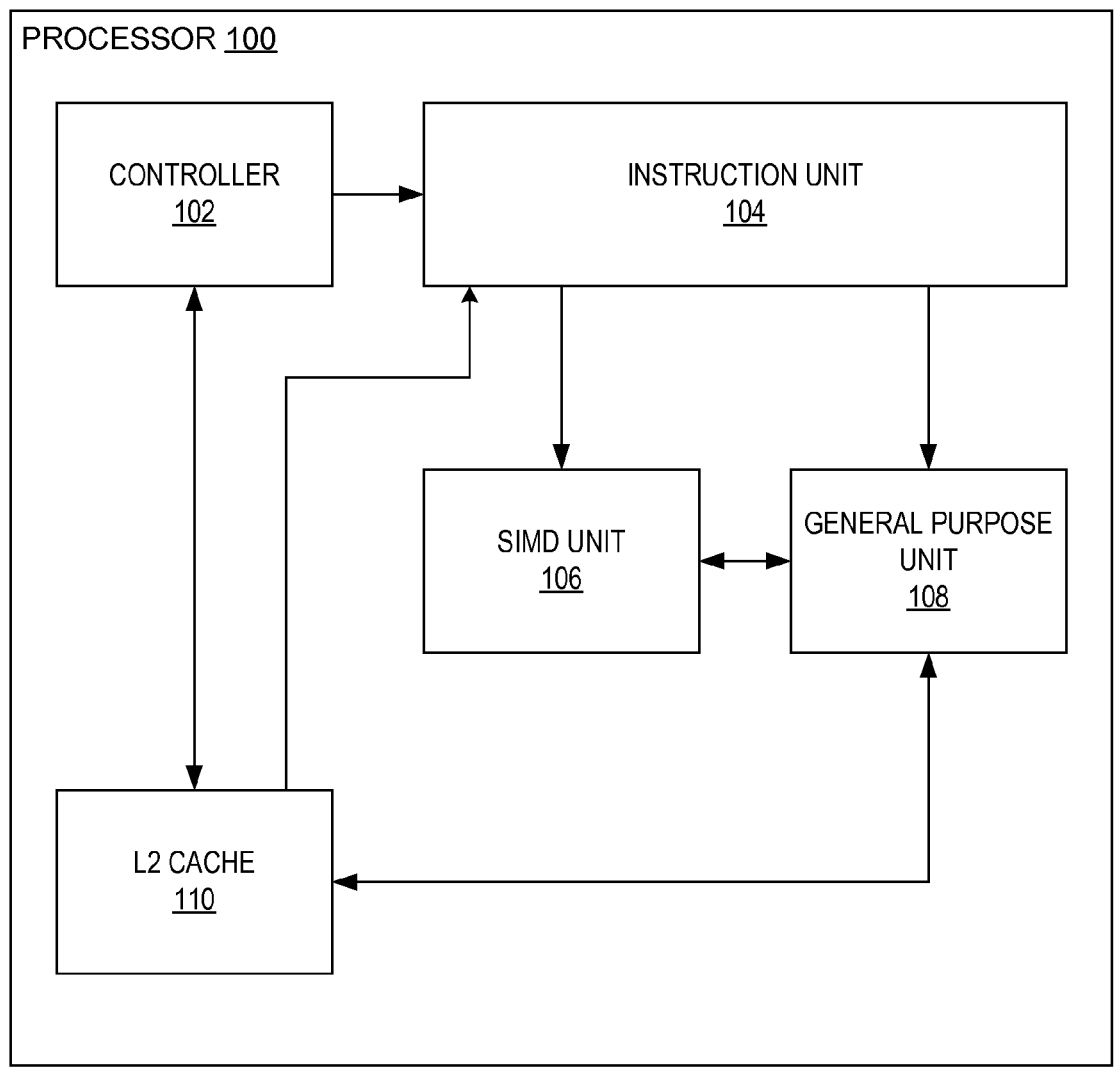
FIG. 1 is a block diagram of a processor.

FIG. 1 is a block diagram of a processor 100. Instruction controller 102 controls the flow of data into and out of the processor 100. Instruction controller 102 sends control signals to aid in the operation of Instruction Unit 104. Instruction Unit 104 issues the instructions that will be executed. Instruction Unit 104 issues SIMD instructions to SIMD Unit 106 and GP instructions to GP Unit 108. SIMD Unit 106 and GP Unit 108 are execution units that execute SIMD and GP instructions, respectively. There is an interface between SIMD Unit 106 and GP Unit 108 because SIMD Unit 106 may need to retrieve data results from GP Unit 108 and GP Unit 108 may need to retrieve data results from SIMD Unit 106. The L2 cache 110 can store instructions and data results. GP Unit 108 retrieves data from L2 cache 110 when necessary to execute instructions. Instruction Unit 104 also retrieves instructions from L2 cache 110 in order to execute program code. Instruction controller 102 sends signals to aid in the storage and retrieval of data to or from L2 cache 110. Processor 100 may contain many other components that are not shown in FIG. 1. FIG. 1 is a basic representation of a processor and does not limit the scope of the present invention.

Figure 2:
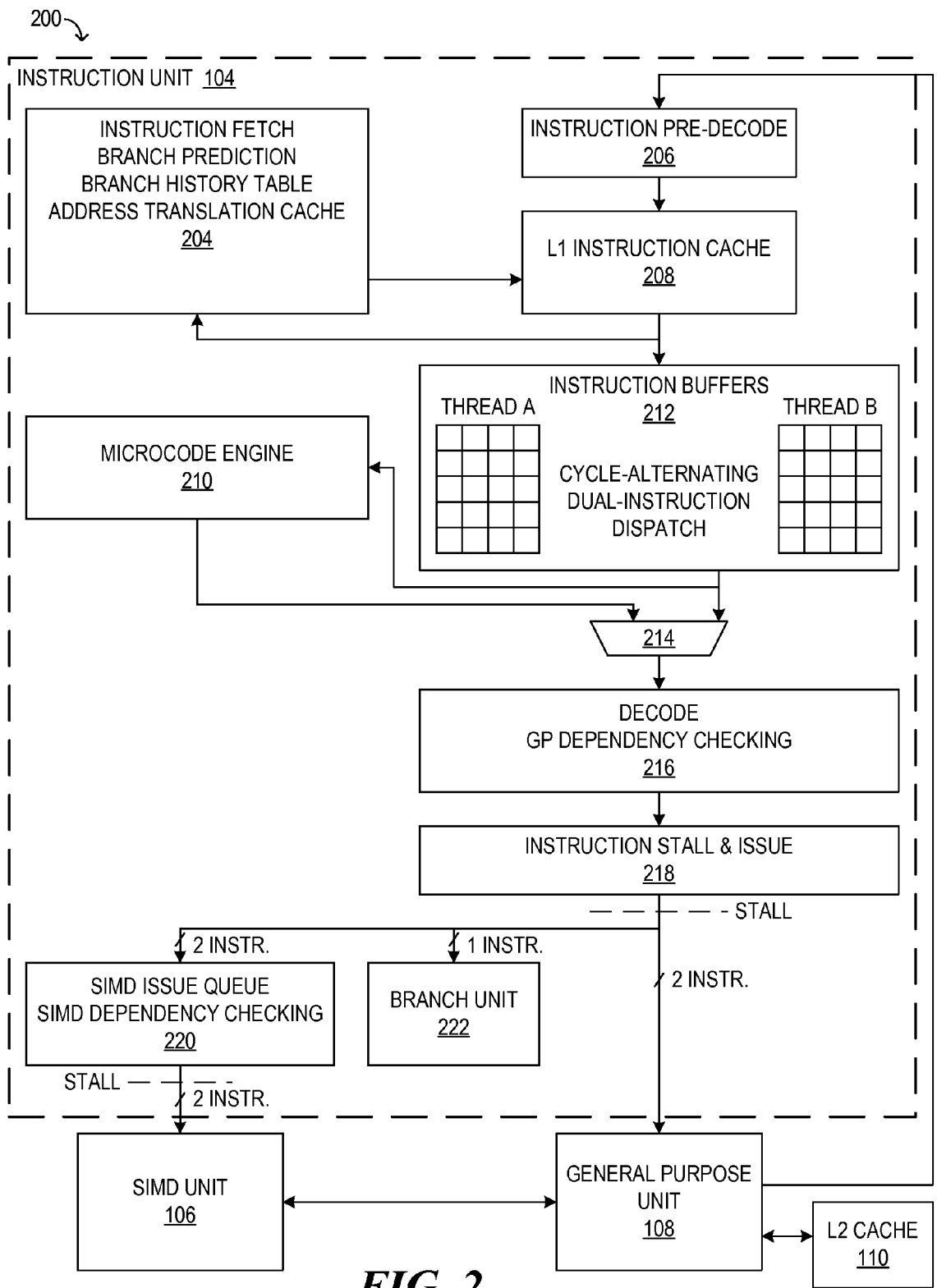
FIG. 2 is a block diagram illustrating an instruction Unit, an SIMD Unit, a GP Unit, and an L2 cache.

FIG. 2 is a block diagram 200 illustrating an Instruction Unit 104, an SIMD Unit 106, a GP Unit 108, and an L2 cache 110. Instruction Unit 104 is a functional unit that is able to decode and execute specific instructions. Accordingly, Instruction Unit 104 contains many components to assist with decoding and executing these instructions. L2 cache 110 stores instructions and/or data results that are used by GP Unit 108 for execution. Within Instruction Unit 104, the instructions enter the instruction pipelines with instruction pre-decode 206. The path of instructions through the operation blocks 206, 208, 212, 214, 216, and 218, are the instruction pipelines. After the instructions are pre-decoded, L1 instruction cache 208 stores the instructions before they are sent to the instruction buffers 212. L1 instruction cache 208 also stores instructions and data results on the Instruction Unit 104 to enable quick access and/or later retrieval.

Before the instructions are sent to the instruction buffers 212, operation block 204 accomplishes many operations, such as instruction fetch, branch prediction, branch history, and address translation. These operations are commonly known in the art, and enable Instruction Unit 104 to operate efficiently. Operation block 204 also signals L1 instruction cache 208 to take branches and store other data when necessary. The instruction buffers 212 contain two threads (A and B). A thread is a program or a group of instructions that can execute independently. Microcode engine 210 reads the group of instructions from the threads (A and B) and controls multiplexer ("MUX") 214 accordingly. MUX 214 dispatches the instructions from the instruction buffers 212. Normally, MUX 214 dispatches instructions from thread A and thread B in equal distribution. The decode pipelines, some of the issue pipelines and some of the dispatch pipelines are referred to as "front end" pipelines. Accordingly, operation blocks 204, 206, 208, 210, 212, and 214 would be considered "front-end" pipelines in FIG. 2.

Operation block 216 further decodes the instructions and checks GP instructions for dependencies. Operation block 218 stalls the instructions and subsequently issues the instructions to the execution units. The stall enables Instruction Unit 104 to ensure that the issued instructions are valid and able to be executed. If an instruction is incorrect or contains a dependency then Instruction Unit 104 flushes the incorrect instruction and subsequent dependent instructions. By flushing the instructions to an earlier portion of the instruction pipelines, Instruction Unit 104 ensures that any exceptional conditions can be resolved before the instructions are issued. In the present invention Instruction Unit 104 does not check the SIMD instructions for dependencies until after the instructions are issued by operation block 218.

Operation block 218 transmits the instructions down three separate paths depending upon the type of instruction. In one embodiment, operation block 218 transmits GP instructions (two at a time) to GP Unit 108, branch instructions (one at a time) to Branch Unit 222, and SIMD instructions (two at a time) to operation block 220. Alternative embodiments can employ different widths of instruction dispatch and issuance. Operation block 220 and Branch Unit 222 reside on Instruction Unit 104. GP Unit 108 executes the GP instructions. Branch instructions are commonly known in the art and enable Instruction Unit 104 to operate more efficiently. Operation block 220 queues the SIMD instructions and checks the instructions for dependencies. A stall for operation block 220 allows Instruction Unit 104 to check for dependences before issuing the SIMD instructions. Operation block 220 issues the SIMD instructions to SIMD Unit 106. FIG. 2 depicts one embodiment of the present invention, and does not limit the present invention to this embodiment.

Figure 3:
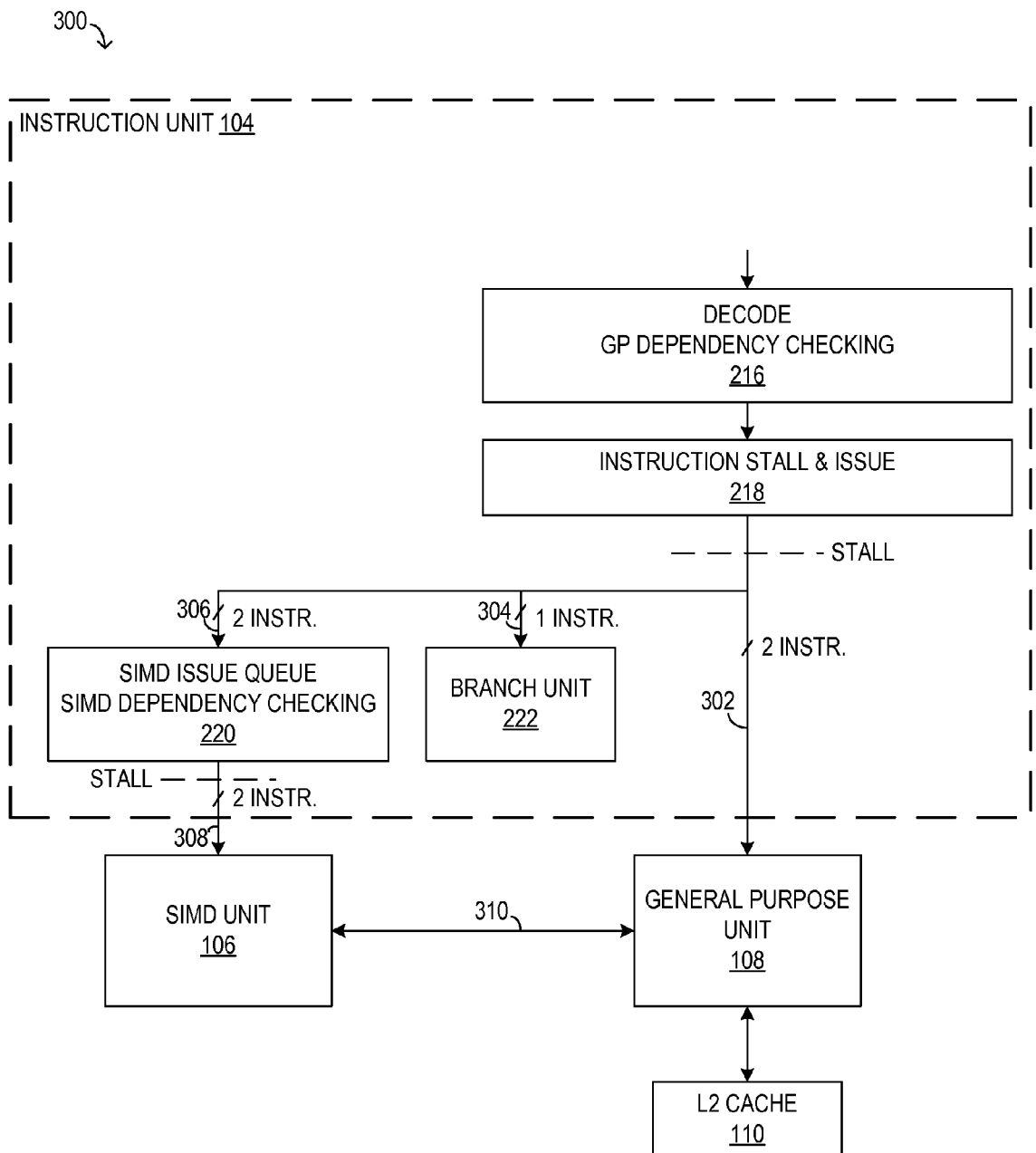
FIG. 3 is a block diagram illustrating an instruction pipeline within an instruction Unit connected to an SIMD Unit, a Branch Unit, and a GP Unit.

FIG. 3 is a block diagram illustrating an instruction pipeline within an instruction Unit connected to an SIMD Unit, a branch Unit, and a GP Unit. FIG. 3 represents the same instruction Unit 104 of FIG. 2 without the "front end" operations (a common term in the art representing the instruction handling portion of the pipeline). Accordingly, the SIMD instructions and the GP instructions share the "front end" of the pipelines for Instruction Unit 104. Operation block 216 decodes the instructions and determines whether the instruction is an SIMD instruction, a branch instruction, or a GP instruction. Operation block 216 checks GP instructions for dependencies, but does not check SIMD instructions. Therefore, the SIMD instructions continue through the instruction pipelines without being checked for dependencies. The stall at operation block 218 enables instruction Unit 104 to resolve dependencies with the GP instructions through the use of a pipeline flush or other mechanism. Accordingly, only GP instructions can trigger a pipeline stall at this point 218.

Operation block 218 sends GP instructions to GP Unit 108 on communication channel 302, branch instructions to branch Unit 222 on communication channel 304, and SIMD instructions to operation block 220 on communication channel 306. Operation block 220 accomplishes the same operations as operation blocks 216 and 218, but with SIMD instructions instead of GP instructions. The stall at operation block 220 enables Instruction Unit 104 to resolve dependencies with the SIMD instructions through the use of a pipeline stall. Instruction Unit 104 flushes the incorrect instructions to the "front end" of the instruction pipelines (as described with reference to FIG. 2) in the event of an exceptional condition or a branch misprediction. Operation block 220 sends the valid SIMD instructions to SIMD Unit 106 for execution on communication channel 308. Communication channel 310 provides an interface between SIMD Unit 106 and GP Unit 108. Accordingly, FIGS. 2 and 3 are provided as an example of the configuration of Instruction Unit 104 in the present invention and do not limit the present invention to this configuration.

The advantage of the present configuration 300 is that the dependency checking for GP instructions is completely separate from the dependency checking for SIMD instructions. The dependency checking of SIMD instructions is after the issuance of GP instructions to GP Unit 108. The SIMD issue queue in operation block 220 is completely independent from the execution of GP instructions. In conventional processors a dependency with an SIMD instruction leads to a latency with subsequent GP instructions within the instruction pipelines. Accordingly, a pipeline stall due to an SIMD dependency stalls the subsequent GP instructions. Therefore, conventional instruction units experience an unnecessary latency for GP instructions. By removing dependency checking for SIMD instructions within the shared pipeline, instruction Unit 104 operates more efficiently with regard to GP instructions. This advantage persists until operation block 220 is filled with instructions due to a SIMD dependency or other stalling condition. When operation block 220 is full, operation block 218 will stall if a SIMD instruction is encountered in order to prevent overflowing the SIMD issue queue on operation block 220. This condition will stall both SIMD instructions and GP instructions. The condition is rare and can be improved by increasing the size of the SIMD issue queue on operation block 220.

The separation of SIMD and GP instructions in the present invention provides many advantages. The physical location of SIMD Unit 106 can be separate from GP Unit 108 because the SIMD issue queue covers the latency between Units. This enables more modular and flexible chip designs, and also simplifies the design of GP Unit 108. The SIMD issue queue and SIMD Unit 106 also helps with timing issues within the processor by simplifying the complicated dependency logic. Furthermore, through the use of operation block 220 (SIMD issue queue and SIMD dependency checking) the latency of SIMD load instructions is hidden to SIMD Unit 106. This leads to better performance for SIMD Unit 106 by allowing SIMD instructions to compute in parallel and out-of-order with respect to GP instructions.

This configuration 300 requires the proper control coordination between SIMD Unit 106 and GP Unit 108 to function properly. In a preferred embodiment, a compiler working in conjunction with the necessary control logic (not shown) controls the operation of this instruction Unit 104 through the use of programmable software. The compiler determines which instructions are SIMD and which instructions are GP at operation block 216. Then, the compiler ensures the validity of GP instructions and SIMD instructions at the stall points of operation block 218 and operation block 220, respectively. Accordingly, the compiler controls the transmission of SIMD instructions on communication channel 306, branch instructions on communication channel 304, and GP instructions on communication channel 302. The compiler optimizes for exceptional conditions and instruction flushing at operation block 216 for GP instructions and operation block 220 for SIMD instructions. Communication channel 310 also enables the compiler to control the load and store communication between SIMD Unit 106 and GP Unit 108.

Figure 4:
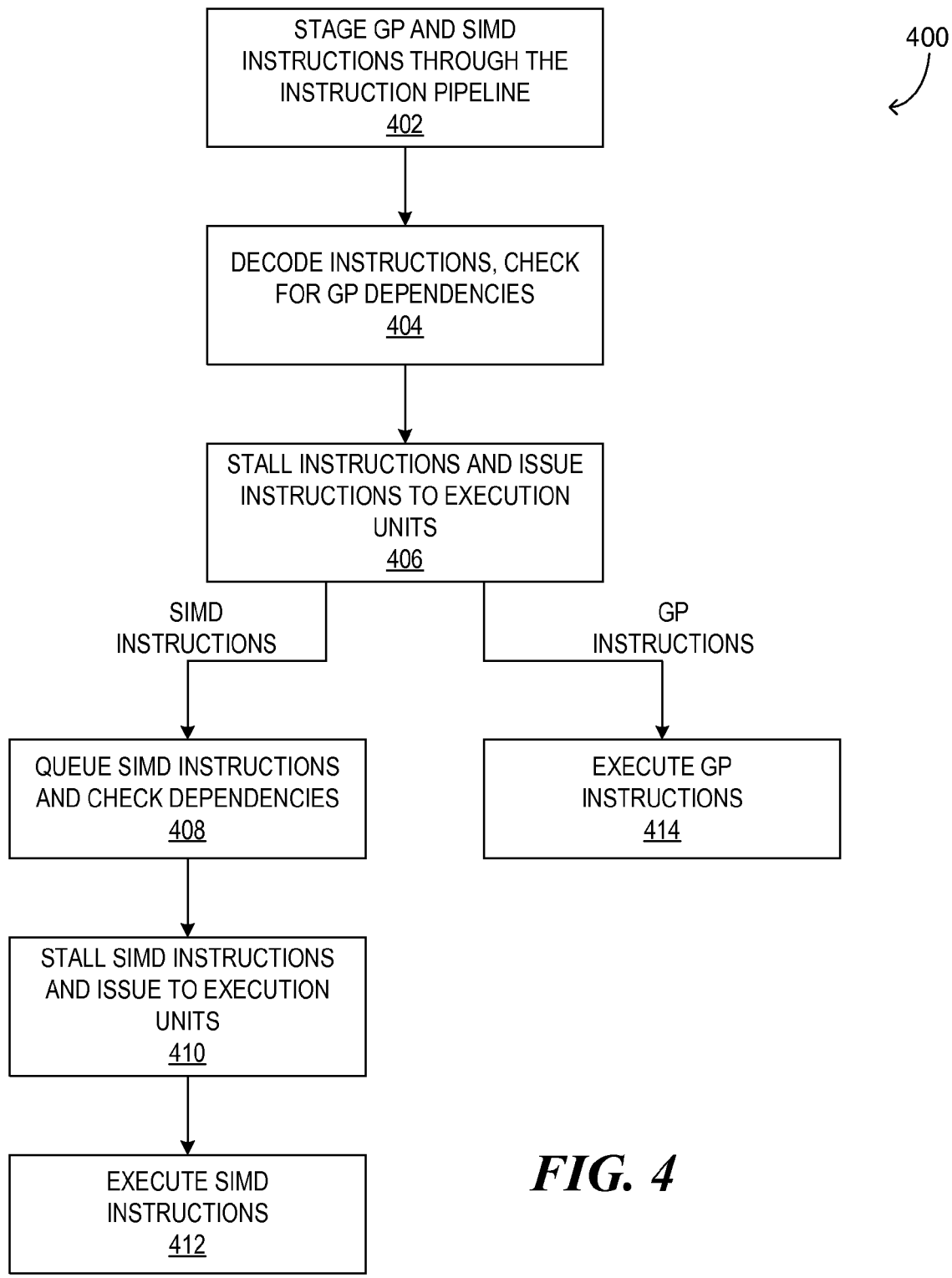
FIG. 4 is a flow chart depicting the separate execution of SIMD instructions and GP instructions in a modified processor.

FIG. 4 is a flow chart 400 depicting the separate execution of SIMD instructions and general purpose instructions in a modified processor. First, Instruction Unit 104 stages all of the instructions (SIMD and GP) through the instruction pipeline 402. Instruction Unit 104 decodes all of the instructions and checks for dependencies with the GP instructions 404. Instruction Unit 104 may need to resolve GP instruction dependencies before the instructions are issued. Instruction Unit 104 stalls all of the instructions (SIMD and GP) if a stall condition occurs and then issues the instructions to the respective execution units 406. Accordingly, the GP instructions go to GP Unit 108, and SIMD instructions go towards the SIMD Unit 106. Instruction Unit 104 queues the SIMD instructions and checks for dependencies 408. Accordingly, the SIMD instructions remain within Instruction Unit 104 until they are issued to the SIMD Unit 106. Instruction Unit 104 stalls the SIMD instructions and then issues these instructions to the SIMD Unit 410. SIMD Unit 106 executes the SIMD instructions 412. Independently, the GP Unit 108 executes the GP instructions 414. It is clear that an instruction unit and ultimately a processor operates more efficiently if the SIMD instructions and the GP instructions can share the same resources, but execute independently. Therefore, SIMD instruction dependencies do not affect the performance of the processor with regard to GP instructions.

It is understood that the present invention can take many forms and embodiments. Accordingly, several variations of the present design may be made without departing from the scope of the invention. This invention can apply to any processor design that has a complex/long pipeline execution unit, such as an SIMD unit and a simple/short pipeline execution unit, such as a GP unit. The capabilities outlined herein allow for the possibility of a variety of networking models. This disclosure should not be read as preferring any particular networking model, but is instead directed to the underlying concepts on which these networking models can be built. The purpose of the present invention is to minimize the delay of simple execution instructions that are caused by complex execution instructions.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A processor, comprising:
   a general purpose (GP) unit adapted to receive GP instructions and configured to execute the GP instructions;
   a single instruction multiple data (SIMD) unit adapted to receive SIMD instructions and configured to execute the SIMD instructions;
   an instruction unit comprising a first logic unit coupled to the GP unit and a second logic unit coupled to the SIMD unit, wherein SIMD instructions are processed subsequent to GP instructions;
   wherein the first logic unit is further configured such that a GP instruction with unresolved dependencies unconditionally causes subsequent SIMD instructions to stall, and an SIMD instruction with unresolved dependencies does not cause subsequent GP instructions to stall;
   wherein the first logic unit is coupled to receive GP instructions and SIMD instructions and configured to:
   decode the GP instructions and the SIMD instructions;
   check the GP instructions for dependencies;

resolve any dependencies in the GP instructions;

provide the GP instructions that are free of dependencies to the GP unit; and subsequent to providing the GP instructions that are free of dependencies to the GP unit, provide the SIMD instructions to the second logic unit when there are no remaining older GP instructions with dependencies;

wherein the first logic unit is not configured to check the SIMD instructions for dependencies; and wherein the second logic unit is coupled to receive the SIMD instructions from the first logic unit and, subsequent to providing, by the first logic unit, the GP instructions that are free of dependencies to the GP unit, configured to:

check the SIMD instructions for dependencies;

resolve any dependencies in the SIMD instructions; and provide the SIMD instructions that are free of dependencies to the SIMD unit.

2. The processor as recited in claim 1, wherein the first logic unit is configured to stall the GP instructions and the SIMD instructions as necessary during the checking of the GP instructions for dependencies and the resolving of any dependencies in the GP instructions.

3. The processor as recited in claim 1, wherein the first logic unit is configured to flush the GP instructions and the SIMD instructions as necessary to resolve any dependencies in the GP instructions.

4. The processor as recited in claim 1, wherein the second logic unit is configured to stall the SIMD instructions as necessary during the checking of the SIMD instructions for dependencies and the resolving of any dependencies in the SIMD instructions.

5. The processor as recited in claim 1, wherein the first logic unit is further configured to determine whether a received instruction is a GP instruction or a SIMD instruction.

6. The processor as recited in claim 1, wherein the instruction unit further comprises front end logic coupled to receive GP instructions and SIMD instructions and to the first logic unit, and wherein the front end logic is configured to decode the GP instructions and the SIMD instructions and to provide the GP instructions and the SIMD instructions to the first logic unit.

7. The processor as recited in claim 6, wherein the front end logic comprises a memory unit for storing instructions.

8. The processor as recited in claim 1, further comprising:

an instruction controller coupled to the instruction unit and configured to control a flow of data into and out of the processor and to provide control signals to the instruction unit; and a memory unit coupled to the instruction controller, the instruction unit, and the GP unit, and configured to store data.

9. The processor as recited in claim 8, wherein the GP unit is configured to retrieve needed data from the memory unit during operation.

10. The processor as recited in claim 8, wherein the data stored in the memory unit comprises instructions, and wherein the instruction unit is configured to retrieve instructions from the memory unit during operation.

11. The processor as recited in claim 8, wherein the instruction controller is configured to provide signals to the memory unit to aid in the storage of data in, and the retrieval of data from, the memory unit.

12. The processor as recited in claim 1, wherein the instruction unit further comprises a branch unit adapted to receive branch instructions and configured to handle the branch instructions, and wherein the first logic unit is coupled to receive GP instructions, SIMD instructions, and branch instructions, and is configured to:

decode the GP instructions and the SIMD instructions;

check the GP instructions for dependencies;

resolve any dependencies in the GP instructions;

provide the GP instructions that are free of dependencies to the GP unit;

subsequent to providing the GP instructions that are free of dependencies to the GP unit, provide the SIMD instructions to the second logic unit; and provide the branch instructions to the branch unit.

* * * * *